US010127582B1

(12) United States Patent
Reiner (10) Patent No.: US 10,127,582 B1
(45) Date of Patent: Nov. 13, 2018

(54) PROCESSING PLATFORM IMPLEMENTING UNIFIED FRAMEWORK FOR TRIGGER, CONTEXT, ACTION AND RESULT ASSOCIATIONS IN RELATION TO CUSTOMER COMMUNICATIONS

(71) Applicant: EMC Corporation, Hopkinton, MA (US)

(72) Inventor: David S. Reiner, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 808 days.

(21) Appl. No.: 14/218,024

(22) Filed: Mar. 18, 2014

(51) Int. Cl.
*G06Q 90/00* (2006.01)
*G06Q 30/02* (2012.01)
*H04L 29/06* (2006.01)

(52) U.S. Cl.
CPC ......... *G06Q 30/0281* (2013.01); *H04L 63/10* (2013.01); *H04L 63/102* (2013.01)

(58) Field of Classification Search
CPC ........ G06Q 10/10; G06Q 10/06; G06Q 50/24; G06Q 30/0281; G06F 17/3028; G06F 21/6218; H04L 67/12; H04L 1/1887; H04L 63/102; H04L 67/025; H04L 63/10; H04L 67/42
See application file for complete search history.

(56) References Cited

U.S. PATENT DOCUMENTS 6,334,110 B1   12/2001   Walter et al.
7,908,159 B1   3/2011    Ordonez et al.
2003/0126095 A1   7/2003   Allen
2004/0103051 A1   5/2004   Reed et al.
2006/0143034 A1*  6/2006   Rothermel ............. G06Q 10/10
                                                    705/301
(Continued)

OTHER PUBLICATIONS

U.S. Appl. No. 14/132,669 filed in the name of D.S. Reiner et al. filed Dec. 18, 2013 and entitled "Analytic Data Focus Representations for Visualization Generation in an Information Processing System."

(Continued)

Primary Examiner — Maroun P Kanaan
(74) Attorney, Agent, or Firm — Ryan, Mason & Lewis, LLP (57) ABSTRACT

An apparatus comprises a processing platform implementing a unified framework for representation and processing of trigger, context, action and result (TCAR) associations and constituent elements thereof in relation to customer communications in an enterprise. The processing platform comprises a TCAR mapper, a TCAR reasoner, a TCAR action commander, and a TCAR repository. The TCAR mapper is configured to capture events and transmogrify corresponding TCAR associations for storage in the TCAR repository. The TCAR reasoner is configured to perform one or more reasoning operations over selected ones of the TCAR associations stored in the TCAR repository. The TCAR action commander is configured to orchestrate one or more actions determined at least in part by the one or more reasoning operations performed by the TCAR reasoner. A given one of the TCAR associations includes as its constituent elements a trigger, context, an action and a result, and may contain additional related information.

20 Claims, 3 Drawing Sheets

(56) References Cited

U.S. PATENT DOCUMENTS

| | | |
|---|---|---|
| 2007/0118419 A1 | 5/2007 | Maga et al. |
| 2008/0249837 A1 | 10/2008 | Angell et al. |
| 2011/0258049 A1* | 10/2011 | Ramer .............. G06F 17/30867 |
| | | 705/14.66 |
| 2012/0022917 A1 | 1/2012 | Lawton et al. |
| 2013/0096947 A1* | 4/2013 | Shah ..................... G06Q 50/24 |
| | | 705/3 |

OTHER PUBLICATIONS

U.S. Appl. No. 13/538,219 filed in the name of D.S. Reiner et al. filed Jun. 29, 2012 and entitled "Dynamic Information Assembly for Designated Purpose Based on Suitability Reasoning Over Metadata."
U.S. Appl. No. 13/336,613 filed in the name of D.S. Reiner et al. filed Dec. 23, 2011 and entitled "Managing Data Sets by Reasoning Over Captured Metadata."

* cited by examiner

PROCESSING PLATFORM IMPLEMENTING UNIFIED FRAMEWORK FOR TRIGGER, CONTEXT, ACTION AND RESULT ASSOCIATIONS IN RELATION TO CUSTOMER COMMUNICATIONS

FIELD

The field relates generally to information processing systems, and more particularly to customer communications in information processing systems.

BACKGROUND

In controlling customer communications in an enterprise, conventional approaches tend to make simplifying assumptions about the "preferred" channel of each customer, without paying sufficient attention to the medium and the cadence of recent communications. While rules may be triggered, it is within a limited context of customer knowledge and understanding that these are applied.

Moreover, conventional approaches are often piecemeal, with multiple silos of disparate and difficult-to-combine data about customers and interaction histories. While predictive models may be built, there is no unifying framework or sequence of actions to formulate the content, channel and timing of real-time or near-real-time customer communication. While dashboards may be present, they are typically custom-built with difficulty, without the leverage of a uniform model of historical customer interactions and outcomes.

SUMMARY

Illustrative embodiments of the present invention provide improved techniques for customer communication utilizing a unified framework based on what are referred to herein as trigger, context, action and result (TCAR) associations.

In one embodiment, an apparatus comprises a processing platform implementing a unified framework for representation and processing of TCAR associations and constituent elements thereof in relation to customer communications in an enterprise. The processing platform comprises a TCAR mapper, a TCAR reasoner, a TCAR action commander, and a TCAR repository. The TCAR mapper is configured to capture events and transmogrify corresponding TCAR associations for storage in the TCAR repository. The TCAR reasoner is configured to perform one or more reasoning operations over selected ones of the TCAR associations stored in the TCAR repository. The TCAR action commander is configured to orchestrate one or more actions determined at least in part by the one or more reasoning operations performed by the TCAR reasoner.

A given one of the TCAR associations includes as at least part of its constituent elements a trigger comprising at least one detectable customer-related event, context comprising a multi-dimensional capture of historical and ongoing events for one or more customers associated with the trigger, an action specifying one or more reactive or proactive responses to the trigger given the context, and a result comprising one or more events that plausibly occurred responsive to the action based on the trigger given the context.

The unified framework for representation and processing of TCAR associations and constituent elements thereof may be implemented using cloud infrastructure or another type of processing platform comprising multiple processing devices.

The illustrative embodiments provide a number of significant advantages relative to the conventional arrangements described above. For example, the unified framework for representation and processing of TCAR associations and constituent elements thereof can provide particularly efficient control of the content, channel, and timing of real-time or near-real-time customer communication based on multiple dimensions of customer characterization and interaction state, consistent with enterprise marketing strategy. As another example, the unified framework can provide more powerful analytics while also facilitating multi-channel communication with enterprise customers and prospects.

Embodiments of the invention include without limitation methods, apparatus, systems, and articles of manufacture comprising processor-readable storage media.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination. The term "TCAR association" is also intended to be broadly construed so as to encompass a wide variety of different data structures or other information arrangements each comprised of constituent elements including one or more of each of triggers, context, actions and results, possibly in combination with other related information.

Figure 1:
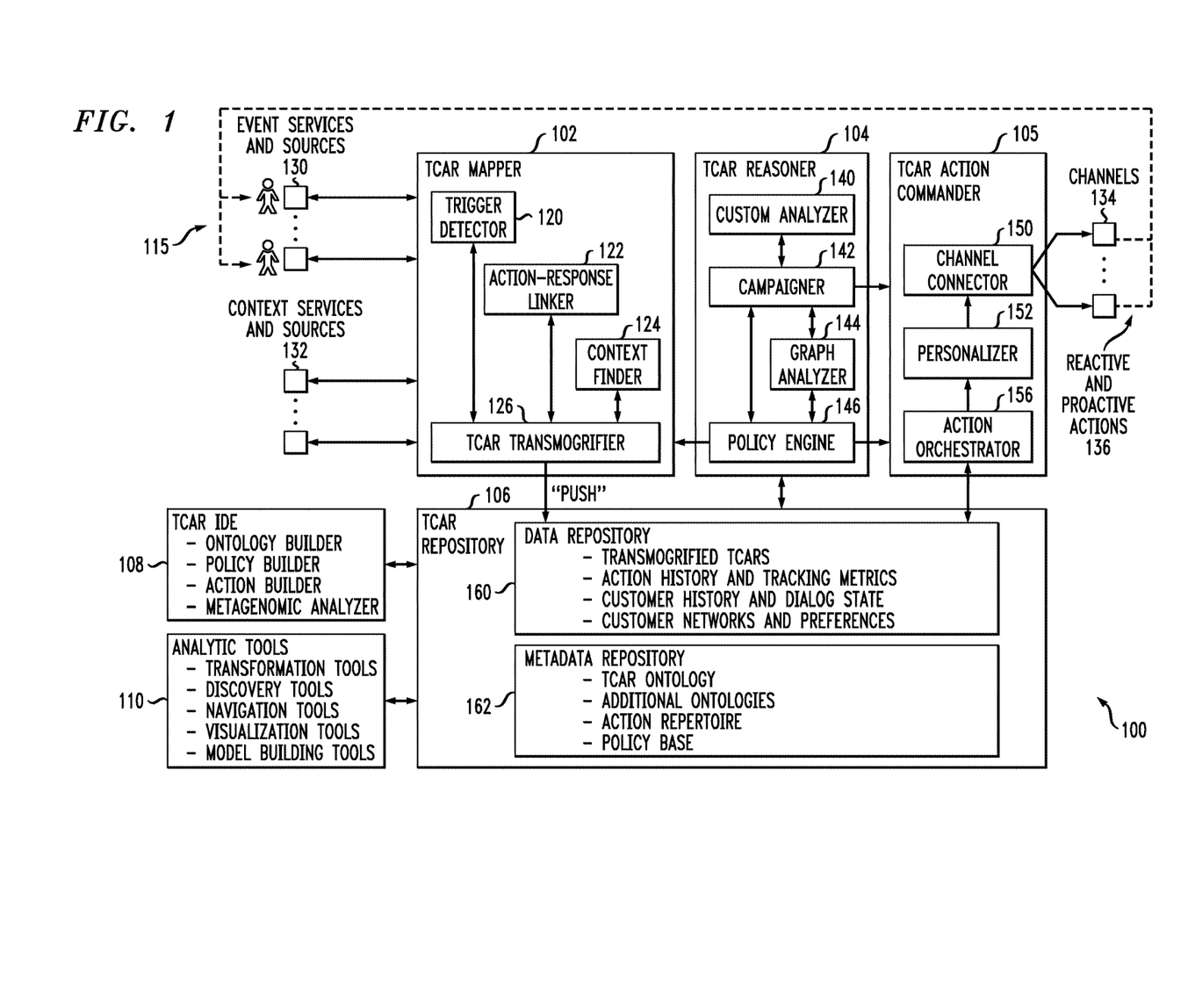
FIG. 1 is a block diagram of an information processing system comprising a unified framework for representing and processing TCAR associations in an illustrative embodiment of the invention.

FIG. 1 shows an information processing system 100 configured in accordance with an illustrative embodiment of the present invention. The information processing system 100 is assumed to be built on at least one processing platform and provides a unified framework for representation and processing of TCAR associations and constituent elements thereof in relation to customer communications in an enterprise. TCAR associations are also referred to herein as simply "TCARs." The unified framework provided by system 100 is also referred to herein as a "TCAR framework."

The information processing system 100 more particularly comprises a TCAR mapper 102, a TCAR reasoner 104, a TCAR action commander 105 and a TCAR repository 106. The TCAR repository 106 is illustratively coupled to a TCAR integrated development environment (IDE) 108 and a set of analytic tools 110.

The TCAR mapper 102 is configured to capture events and transmogrify corresponding TCAR associations for storage in the TCAR repository 106. At least a portion of the events may be associated with respective customers 115, although events may additionally or alternatively be associated with triggers, context, results or other TCAR-related information. The term "event" as used herein is therefore intended to be broadly construed.

The TCAR reasoner 104 is configured to perform one or more reasoning operations over selected ones of the TCAR associations stored in the TCAR repository 106.

The TCAR action commander 105 is configured to orchestrate one or more actions determined at least in part by the one or more reasoning operations.

The system 100 is assumed to be associated with a business, organization or other enterprise that services customers 115. Such an enterprise is also referred to herein as a "TCAR-enabled" enterprise.

A given one of the TCAR associations includes as at least part of its constituent elements a trigger comprising at least one detectable customer-related event, context comprising a multi-dimensional capture of historical and ongoing events for one or more customers associated with the trigger, an action specifying one or more reactive or proactive responses to the trigger given the context, and a result comprising one or more events that plausibly occurred responsive to the action based on the trigger given the context. It should be understood, however, that this particular arrangement of constituent elements is exemplary only, and other TCARs may comprise multiple instances of at least one of triggers, context, actions and results, as well as additional information associated with such elements.

Accordingly, one or more TCARs may at least initially contain incomplete knowledge, such as a trigger only, a response only or other subsets of triggers, context, actions and results. Such partial TCARs are processed within the system 100 and through such processing can generate additional partial or complete TCARs or themselves become complete TCARs.

A number of additional examples of triggers, context, actions and results that may be part of a given TCAR association in system 100 will now be described in more detail.

In some embodiments, a trigger comprises a point-in-time event that is noticed, recognized or otherwise surfaced within the TCAR framework. Triggers can more particularly include, by way of example, customer requests in any channel (e.g., contact, information, quote, service, response to enterprise or partner communication), logins and clickstream behavior (e.g., at the enterprise web site, partner web sites, online support sites or social media sites under a known customer Facebook or Twitter handle or blog ID), media mentions (e.g., industry recognition of customer), content views (e.g., of online product datasheet, of an enterprise white paper), time-based events (e.g., maintenance up for renewal shortly, 3 months since last contact) and campaign-driven events (e.g., meets conditions for new cross-sell campaign). In general, trigger elements of a given TCAR can include any events that the enterprise would like to track or to which the enterprise may wish to respond.

As indicated above, context illustratively comprises a multi-dimensional capture of historical and ongoing customer dialogs and events for the customer involved in the trigger. More particularly, context can include, for example, the identity of the actual person or other entity involved (if known), prior purchases, state of the conversation (e.g., inbound or outbound), customer channel preferences (e.g., research, questions, confirmation, advocacy), customer segment, customer profile, customer classification, communication cadence, usual customer focus (e.g., use case, product, landscape), social networking presence (e.g., Facebook, Twitter, Klout), role in decision-making and relationship to other customers.

Certain aspects of customer context can be characterized using generalized tag cloud visualizations or other types of analytic data focus representations, as described in U.S. patent application Ser. No. 14/132,669, filed Dec. 18, 2013 and entitled "Analytic Data Focus Representations for Visualization Generation in an Information Processing System," which is commonly assigned herewith and incorporated by reference herein.

As mentioned previously, an action illustratively comprises one or more enterprise responses, reactive or proactive, to a trigger given the context. For example, an action may involve sending an acknowledgement through a customer's preferred channel of a communication, presenting product or service choices (e.g., new-sell, cross-sell, up-sell), presenting offers and options, providing follow-up opportunities (including referral to a partner), suggesting online communities to join in order to follow the enterprise (e.g., via specified social media or blogs), providing rewards and numerous others. Some actions flow from marketing campaigns, and others, such as those involving custom content creation, are based on the state of the current dialog and the likely customer expectations of the next step.

It is also possible that an action or response may itself comprise another trigger event. Thus, for example, an action in one TCAR can be a trigger for another TCAR, and a result in one TCAR can be a trigger for another TCAR. Such correspondence between TCAR elements across multiple TCARs can be utilized in performing metagenomic processing as described elsewhere herein.

Again, the triggers, context, actions and results described above are exemplary only, and alternative TCAR elements can be used in other embodiments.

In the TCAR framework, communication strategies can be configured to convey a set of coherent messages from the enterprise over time. Previous actions and their corresponding results are captured for analysis and follow-up, and new actions are selected and tracked as part of ongoing customer dialogs. If context is missing or deficient for a given TCAR, generic actions can be used as a fallback mechanism.

It was noted above that a result illustratively comprises one or more events that plausibly occurred responsive to the action based on the trigger given the context. More particularly, results themselves can be seen as new triggers to a continued dialog and also as updates to customer context. Such aspects help the enterprise with consistency of messaging and with relevance to customer goals and frame of mind. A result need not be a purchase, but may instead include any of a wide variety of different responses that indicate whether or not the customer is engaged and ready to take the next step. Metrics for result tracking can include, for example, lead generation, clickthrough rates, churn reduction, marketing campaign lift, customer acquisition cost, new-sell percentages, cross-sell percentages, up-sell percentages, video views, social media impacts such as positive tweets, and A-B testing of unique online selling propositions to specific customer segments.

The TCAR mapper 102 in the present embodiment illustratively comprises a trigger detector 120, an action-response linker 122, a context finder 124 and a TCAR transmogrifier 126. The TCAR transmogrifier 126 has inputs coupled to respective outputs of the trigger detector 120, the action-response linker 122 and the context finder 124. The TCAR transmogrifier 126 utilizes one or more triggers, action-response links and context from the respective trigger detector 120, action-response linker 122 and context finder 124 in conjunction with one or more policies to process captured events in transmogrifying the corresponding TCAR associations. The policies are obtained by the TCAR mapper 102 from the TCAR reasoner 104, possibly using "pull" communications although other communication mechanisms can be used. The resulting transmogrified TCARs or suitable portions thereof are delivered to the TCAR repository 106 using "push" communications as illustrated. Again, other types of communication mechanisms can be used in other embodiments.

Policies can also be utilized by other components of the TCAR mapper 102. For example, a policy could be used to establish a lag time for linking a response to an action in the action-response linker 122.

The transmogrified TCARs pushed by the TCAR mapper 102 to the TCAR repository 106 are transformed in a manner that advantageously enables discovery through analysis. Such analysis may include, by way of example, the metagenomic analysis referred to elsewhere herein. The transmogrification performed by TCAR transmogrifier 126 can therefore be viewed as encompassing, for example, a type of transformation that imposes a form of unification on the TCAR associations. The target of such a transformation in some embodiments is a canonical representation possibly governed by a TCAR ontology, and may be in the form of a graph, a searchable form, a Resource Description Framework (RDF) representation, or another type of representation, and as indicated previously may comprise complete or partial information.

The TCAR mapper 102 communicates with event services and sources 130 and with context services and sources 132. At least portions of the event services and sources 130 and the context services and sources 132 are assumed to be associated with customers 115. Events from the event services and sources 130 are detected by the trigger detector 120, although the trigger detector can additionally or alternatively detect triggers using information supplied by the context services and sources 132. An example of the latter type of trigger could be hitting a threshold in the cost of a resource. The context services and sources 132 are also utilized by the context finder 124 to obtain context information. The customers 115 are each associated with one or more communication channels 134 through which the TCAR action commander 105 takes reactive and proactive actions 136 based on reasoning operations performed by the TCAR reasoner 104.

The TCAR reasoner 104 in the present embodiment illustratively comprises a custom analyzer 140, a campaigner 142, a graph analyzer 144 and a policy engine 146. The TCAR reasoner 104 utilizes one or more of the custom analyzer 140, campaigner 142, graph analyzer 144 and policy engine 146 in performing one or more reasoning operations over selected ones of the TCAR associations stored in the TCAR repository 106. The policy engine 146 of the TCAR reasoner 104 is configured to determine one or more policies each for utilization by at least one of the TCAR mapper 102 and the TCAR action commander 105. Policies determined by the policy engine 146 are also utilized within the TCAR reasoner 104, illustratively by the campaigner 142 and the graph analyzer 144. For example, the campaigner 142 may utilize a policy limiting the frequency of campaigns. The policy determinations made by the policy engine 146 may be based at least in part on a policy base maintained within the TCAR repository 106, as will be described in more detail below.

The TCAR action commander 105 in the present embodiment illustratively comprises a channel connector 150 configured to communicate with customers 115 over one or more of the channels 134, a personalizer 152 configured to generate personalized communications for actions involving one or more of the customers 115, and an action orchestrator 156 configured to control at least one of a reactive action and a proactive action utilizing the one or more channels. The reactive and proactive actions are illustratively based at least in part on an action repertoire implemented in the TCAR repository 106.

The TCAR repository 106 in the present embodiment more particularly comprises a data repository 160 and a metadata repository 162.

The data repository 160 comprises transmogrified TCARs, action history and tracking metrics, customer history and dialog state, and customer networks and preferences.

The metadata repository 162 comprises a TCAR ontology as well as one or more additional ontologies such as, for example, customer ontologies, product ontologies, channel ontologies, social media ontologies and vertical-specific ontologies (e.g., health care, financial services). The metadata repository 162 further comprises the above-noted action repertoire and policy base. The action repertoire includes reactive and proactive actions that can be carried out under control of the action orchestrator 156 of the TCAR action commander 105. The policy base includes policies that are accessed by the policy engine 146 of the TCAR reasoner 104 for use by the TCAR mapper 102, TCAR reasoner 104 and TCAR action commander 105.

The term "metadata" as used herein is intended to be broadly construed, so as to encompass at least portions of TCARs, as well as other types of metadata characterizing TCARs. Accordingly, particular types of metadata referred to herein may in some embodiments be considered part of a TCAR association.

Additional details regarding exemplary types of metadata and associated reasoning functionality that may be implemented in the system 100 can be found in U.S. patent application Ser. No. 13/538,219, filed Jun. 29, 2012 and entitled "Dynamic Information Assembly for Designated Purpose based on Suitability Reasoning over Metadata," and U.S. patent application Ser. No. 13/336,613, filed Dec. 23, 2011 and entitled "Managing Data Sets by Reasoning over Captured Metadata," both of which are commonly assigned herewith and incorporated by reference herein.

The TCAR IDE 108 in the FIG. 1 embodiment comprises an ontology builder, a policy builder, an action builder and a metagenomic analyzer, although additional or alternative IDE components could be used in other embodiments. The TCAR IDE is utilized for development of ontologies, policies and actions relating to TCARs. These ontologies, policies and actions are stored in the metadata repository 162 and are thereby made accessible to other system components such as TCAR mapper 102, TCAR reasoner 104 and TCAR action commander 105. Analyses performed using the metagenomic analyzer are utilized in the development of one or more of the ontologies, policies and actions, or for other types of TCAR-related development. For example, the metagenomic analyzer can analyze alignment or other correspondence between TCAR elements across multiple TCAR associations in order to discover relationships that are applied in development of ontologies, policies and actions relating to TCARs. Such metagenomic analysis performed in the TCAR IDE 108 is in some respects analogous to genomic processing of adenine, guanine, cytosine and thymine (AGCT) elements in the field of bioinformatics. Outputs of the metagenomic analyzer can be used, for example, in the custom analyzer 140 of the TCAR reasoner 104, or in other components of the system 100.

The analytic tools 110 in the FIG. 1 embodiment illustratively include transformation tools (e.g., Hadoop), discovery tools (e.g., data source discovery tools), navigation tools (e.g., faceted navigation tools), visualization tools (e.g., dashboarding tools) and model building tools (e.g., tools for generating segmentations, classifiers and predictive models), although additional or alternative analytic tools could be used in other embodiments. The analytic tools 110 are shown in FIG. 1 as being separate from the TCAR mapper 102, TCAR reasoner 104, TCAR action commander 105 and TCAR repository 106, but at least a portion of the functionality of one or more of the analytic tools 110 may be implemented in one or more such system components in other embodiments. Accordingly, the analytic tools 110 may be external to the TCAR framework or internal to that framework.

It is to be appreciated that the particular arrangement of system components illustrated in FIG. 1 is exemplary only, and that numerous other arrangements of components may be used in other embodiments. For example, in other embodiments, functionality described herein as being associated with one or more of the TCAR mapper 102 and the TCAR action commander 105 may be implemented at least in part in the TCAR reasoner 104, or using additional or alternative components of the system 100.

The TCAR mapper 102, TCAR reasoner 104 and TCAR action commander 105 and possibly other components of system 100 in the present embodiment are assumed to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The one or more processing devices implementing TCAR mapper 102, TCAR reasoner 104, TCAR action commander 105 and possibly other components of system 100 may each further include a network interface that allows such components to communicate with one another over one or more networks. For example, a given such network interface illustratively comprises network interface circuitry that allows at least one of TCAR mapper 102, TCAR reasoner 104 and TCAR action commander 105 to communicate over a network with other components of the system 100 such as TCAR repository 106, event services and sources 130, context services and sources 132 and channels 134. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the TCAR mapper 102, TCAR reasoner 104 and TCAR action commander 105 and possibly other system components may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 4 and 5.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

Figure 2:
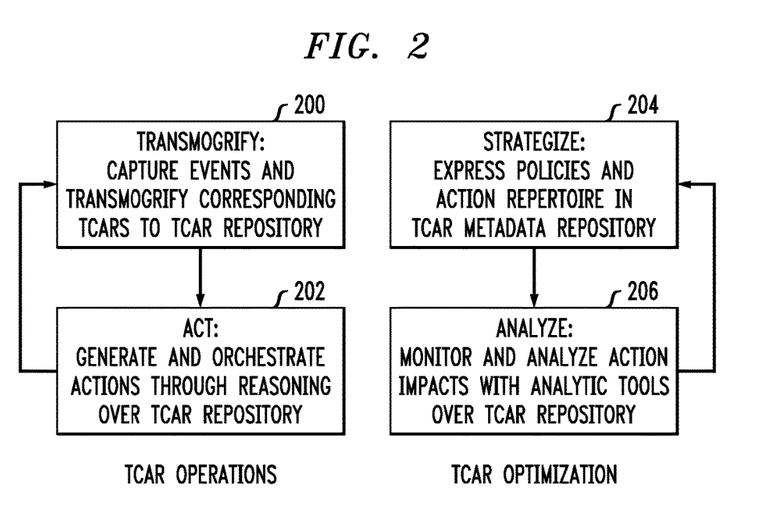
FIG. 2 illustrates exemplary processing configurations of the unified framework in the information processing system of FIG. 1.

Referring now to FIG. 2, exemplary processing configurations are shown for the TCAR framework in the information processing system 100.

The processing configurations illustratively include a TCAR operations configuration on the left side of the figure and a TCAR optimization configuration on the right side of the figure, although it is to be noted that numerous other processing configurations are possible using the TCAR framework in system 100.

The TCAR operations configuration comprises a TCAR operations loop including a transmogrify block 200 in which events are captured and corresponding TCARs transmogrified to the TCAR repository 106 and an act block 202 in which actions are generated and orchestrated based on reasoning over the TCAR repository 106. As indicated previously, the term "event" as used herein is intended to be broadly construed.

The TCAR optimization configuration comprises a TCAR optimization loop including a strategize block 204 in which policies and actions built in the TCAR IDE 108 are expressed in the policy base and action repertoire of the TCAR metadata repository 162 and an analyze block 206 in which action impacts are monitored and analyzed over the TCAR repository 106 using one or more of the analytic tools 110.

The TCAR operations configuration and the TCAR optimization configuration as illustrated in FIG. 2 are assumed to be associated with respective lower layer and higher layer processing within the TCAR framework. Thus, the TCAR optimization comprising blocks 204 and 206 is illustratively viewed as operating over the TCAR operations configuration comprising blocks 200 and 202. Numerous alternative arrangements of processing layers and associated blocks are possible in other embodiments.

The operation of the information processing system 100 will now be described in greater detail with reference to the flow diagram of FIG. 3, which illustrates an exemplary process carried out by the system in one embodiment. The process as shown includes steps 300 through 306. Step 300 is performed utilizing at least one processing platform of the system 100, and steps 302, 304 and 306 are performed by the TCAR mapper 102, TCAR reasoner 104 and TCAR action commander 105, respectively.

In other embodiments, at least portions of one or more of these process steps may be performed by other system components. Moreover, the unified framework for representation and processing of TCAR associations should not be viewed as being limited in any way to the particular process steps described below.

In step 300, a processing platform is configured to implement a unified framework for representation and processing of TCAR associations and constituent elements thereof in relation to customer communications in an enterprise. As noted above, such an enterprise is referred to herein as a TCAR-enabled enterprise.

In step 302, events are captured and corresponding TCAR associations are transmogrified for storage in the TCAR repository 106. For example, this may involve receiving one or more detected triggers, action-response links and context associated with at least one event processed by the respective trigger detector 120, action-response linker 122 and context finder 124 of the TCAR mapper 102. The received triggers, action-response links and context are utilized by the TCAR transmogrifier 126 of the TCAR mapper 102 in conjunction with one or more policies obtained from policy engine 146 to process the captured events in transmogrifying the corresponding TCAR associations. As indicated previously, policies from the policy engine 146 can also be used by other components of the TCAR mapper 102, including trigger detector 120, action-response linker 122 and context finder 124.

In step 304, one or more reasoning operations are performed over selected ones of the TCAR associations stored in the TCAR repository 106. Such reasoning operations are performed by the TCAR reasoner 104 and illustratively involve use of one or both of the data repository 160 and the metadata repository 162. In performing the reasoning operations, the TCAR reasoner 104 utilizes one or more of the custom analyzer 140, the campaigner 142, the graph analyzer 144 and the policy engine 146.

In step 306, one or more actions determined at least in part by the one or more reasoning operations are orchestrated by the TCAR action commander 105. For example, the action orchestrator 156 operates in conjunction with the personalizer 152 and channel connector 150 to control reactive and proactive actions 136 for communication with customers 115 over the selected channels 134.

Figure 3:
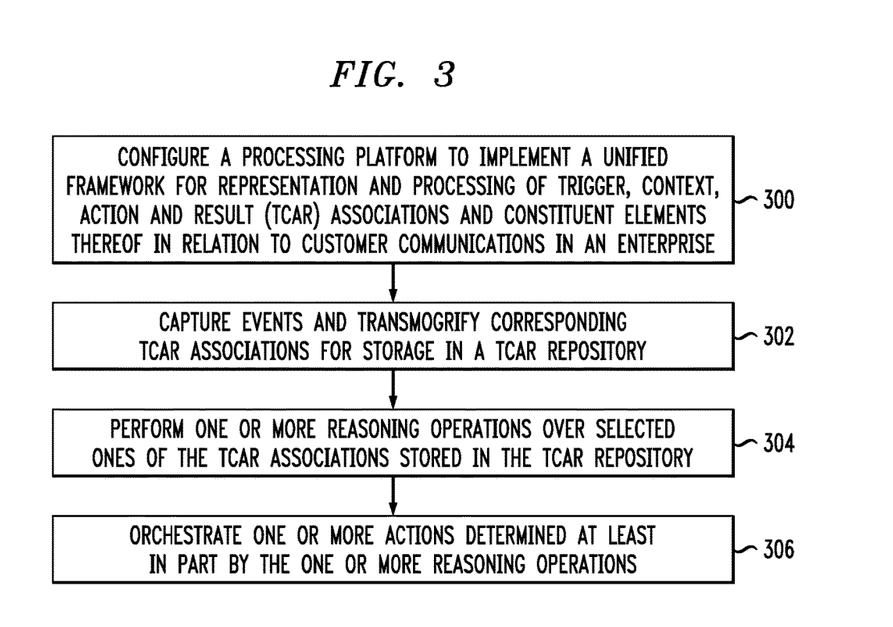
FIG. 3 is a flow diagram of an exemplary process implemented in the information processing system of FIG. 1.

The FIG. 3 process illustratively provides a TCAR framework that expresses customer history, current state and future marketing strategy using TCAR associations and other related information stored in the TCAR repository 106. The TCAR framework illustratively represents historical interactions and guides new ones, analyzes behavior and campaigns, and allows the enterprise to act across channels in an integrated and strategic fashion.

Accordingly, the TCAR framework can be used to implement an integrated approach to marketing within a given TCAR-enabled enterprise. Such an integrated approach to marketing can include, for example, the following activities:

1. Specify details of the TCAR data capture (e.g., content and mechanisms), and begin to capture customer triggers, context, actions and results within the framework. Selected historical activity may also be re-expressed in this manner, possibly through extract/load/transform approaches from current repositories to Greenplum or other analytic data stores.

2. Express marketing strategies, campaigns and points of view within the TCAR framework, to drive actions based on triggers and context. This need not bypass existing enterprise campaign management systems, but can instead be linked to them and to related marketing resource management systems via the campaigner 142. This activity can be used to answer questions such as:

What do we want to say to a customer first viewing website content on a particular product?

What is the appropriate follow-up three days after release of a white paper on a particular product?

What can we say about services to a customer who seems to be migrating to a new data center?

Of course, these questions are exemplary only, and the TCAR framework can be configured to automatically take actions on such questions.

3. Monitor and quickly analyze ongoing communications and results within the TCAR framework. This may involve use of real-time or near-real-time dashboards for triggers, context, actions and results, and can answer questions such as:

How many customers have responded to an online campaign in the last 15 minutes?

What direction are customer online sentiments trending on the latest announcement of a particular product?

How is the real-time or near-real-time A-B testing of two offers doing with respect to lift in responses and click-throughs?

What is the unsubscribe rate from a new campaign that the enterprise thought would work well?

What are the top blogs so far today on particular social media? Again, these particular questions are presented by way of example only.

4. Apply data science techniques to analyze the TCAR data. This will help to develop predictive models for the best next actions within customer dialogs, based on triggers, context and results. It will identify dialogs and situations that are more likely to result in positive outcomes, and help the enterprise to strategize on how to move these dialogs in the right direction. Big data analytics (e.g., using Hadoop and other analytic tools) can be applied to the historical TCAR data stored in TCAR repository 106. Since results themselves may serve as triggers for subsequent actions, applying powerful graph analytics to TCAR data using graph analyzer 144 can be particularly helpful, as will visualization of customer sentiments and attitudes. Successful campaign approaches can be recognized and reinforced early, and the less successful approaches weeded out quickly. In this context, metrics such as customer recency, frequency and monetary value (RFM) and customer lifetime value (LTV) can be augmented by additional metrics such as customer advocacy strength and reach (ASR). Traditional measures such as leads and the linear funnel can be augmented by measurements of deeper customer engagement with the enterprise. More generally, the TCAR framework can be used to optimize Total Customer Communication Experience (TCCE), as a key part of Total Customer Experience (TCE).

The particular processing operations and other system functionality described in conjunction with the flow diagram of FIG. 3 as well as the related activities listed above are presented by way of illustrative example only, and should not be construed as limiting the scope of the invention in any way. Alternative embodiments can use other types of processing operations for implementing a TCAR framework in system 100. For example, the ordering of the process steps may be varied in other embodiments, or certain steps may be performed concurrently with one another rather than serially. Also, a wide variety of alternative activities can be applied using the TCAR framework.

It is to be appreciated that functionality such as that described in conjunction with the flow diagram of FIG. 3 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

The illustrative embodiments provide a number of significant advantages relative to the conventional arrangements described above. For example, the TCAR framework can provide particularly efficient control of the content, channel, and timing of real-time or near-real-time customer communication based on multiple dimensions of customer characterization and interaction state, consistent with enterprise marketing strategy.

The TCAR framework takes customer preferences and history into account, improves customer experiences, and leads to improved outcomes in both conventional and new metrics. It allows an enterprise to communicate at the same pace as its customers, following their leads and customizing their experiences.

Also, the TCAR framework can be built efficiently on top of existing data gathering functionality and tools, as well as existing analytics and visualization approaches, but introduces improved representation of triggers, context, actions and results.

Moreover, the TCAR framework can provide more powerful analytics while also facilitating multi-channel communication with enterprise customers and prospects. It therefore dovetails well with traditional marketing approaches while offering new opportunities for customer communications and big data analytics.

Embodiments of the invention can be deployed in a phased approach within a given enterprise, with early implementation of the TCAR framework focused on capturing the basic elements of triggers, context, actions and results, followed by subsequent optimization through strategizing and analyzing. For example, a given embodiment can be configured to perform activities such as capturing multi-channel data, expressing marketing strategies, tracking results in real-time or near-real-time, and analyzing historical data to develop new models for cross-channel marketing and other forms of customer interaction.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 4:
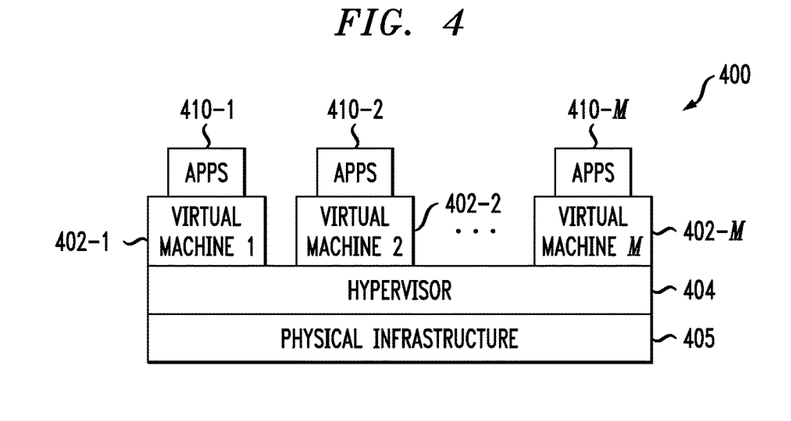
FIGS. 4 and 5 show examples of processing platforms that may be utilized to implement at least a portion of the information processing system of FIG. 1.

As shown in FIG. 4, portions of the information processing system 100 may comprise cloud infrastructure 400. The cloud infrastructure 400 comprises virtual machines (VMs) 402-1, 402-2, ... 402-M implemented using a hypervisor 404. The hypervisor 404 runs on physical infrastructure 405. The cloud infrastructure 400 further comprises sets of applications 410-1, 410-2, ... 410-M running on respective ones of the virtual machines 402-1, 402-2, ... 402-M under the control of the hypervisor 404.

Although only a single hypervisor 404 is shown in the embodiment of FIG. 4, the system 100 may of course include multiple hypervisors each providing a set of virtual machines using at least one underlying physical machine. For example, different sets of virtual machines provided by respective ones of multiple hypervisors may be utilized in configuring multiple instances of TCAR mapper 102, TCAR reasoner 104, TCAR action commander 105 or other components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

Figure 5:
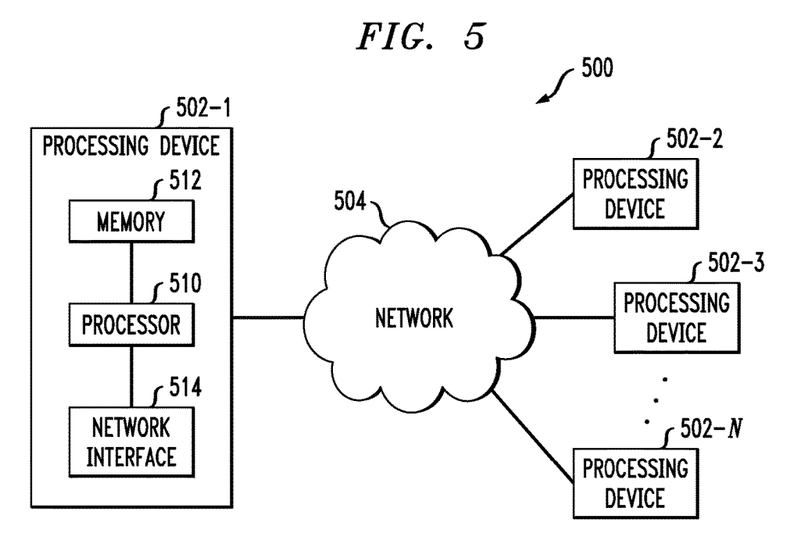

The processing platform 500 in this embodiment comprises a portion of system 100 and includes a plurality of processing devices, denoted 502-1, 502-2, 502-3, ... 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an ASIC, an FPGA, or other type of processing circuitry, as well as portions or combinations of such circuitry elements.

The memory 512 may comprise RAM, ROM or other types of memory, in any combination. As mentioned previously, the memory 512 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, mappers, reasoners, action commanders, repositories and other components. In addition, the particular TCAR representations, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform implementing a unified framework for representation and processing of trigger, context, action and result (TCAR) associations and constituent elements thereof in relation to customer communications in an enterprise;
wherein the processing platform is configured:
to capture events by detecting one or more triggers associated with customer-related events, finding context for the one or more triggers by capturing historical and ongoing events for one or more customers associated with the customer-related events, and generating one or more action-response links each comprising at least one action specifying one or more responses to a given trigger based on its associated context and at least one response comprising one or more events that plausibly occurred responsive to the given action based on the given trigger and its associated context;
to transmogrify corresponding TCAR associations for storage in a TCAR repository by transforming the triggers, context and action-response links for the captured events into a unified representation governed by a specified TCAR ontology;
to perform one or more reasoning operations over selected ones of the TCAR associations stored in the TCAR repository utilizing one or more policies stored in the TCAR repository to identify one or more actions to orchestrate based on analysis of the selected TCAR associations and the policies stored in the TCAR repository; and
to orchestrate the one or more actions determined at least in part by the one or more reasoning operations to control one or more of content, channel, and timing of ongoing customer communications, the one or more actions being selected from an action repertoire stored in the TCAR repository;
wherein the processing platform comprises one or more processing devices each comprising a processor coupled to a memory;
wherein the processing platform is further configured to implement an integrated development environment for performing an operations configuration loop and an optimization configuration loop;
wherein the operations configuration loop comprises capturing the events, developing the specified TCAR ontology, and orchestrating the actions based on reasoning over the TCAR repository; and
wherein the optimization configuration loop comprises monitoring impacts of the orchestrated actions using one or more analytic tools and developing the action repertoire and the policy base by analyzing: (i) alignment or other correspondence between elements of multiple TCAR associations stored in the TCAR repository; and (ii) the monitored impacts of the orchestration actions.

2. The apparatus of claim 1 wherein the processing platform is configured to orchestrate the one or more actions determined at least in part by the one or more reasoning operations by controlling at least one of a reactive action and a proactive action utilizing one or more channels configured for communication with customers.

3. The apparatus of claim 1 wherein the processing platform is configured to orchestrate the one or more actions determined at least one in part by the one or more reasoning operations by generating personalized communications for actions involving one or more customers.

4. The apparatus of claim 1 wherein the TCAR repository comprises a data repository and a metadata repository.

5. The apparatus of claim 4 wherein the data repository comprises a plurality of transmogrified TCAR associations and one or more of action history, tracking metrics, customer history, dialog state, customer networks and customer preferences.

6. The apparatus of claim 4 wherein the metadata repository comprises the specified TCAR ontology and one or more of an additional ontology, the action repertoire and a policy base comprising the one or more policies.

7. An information processing system comprising the apparatus of claim 1.

8. The apparatus of claim 1 wherein the integrated development environment is configured to analyze alignment or other correspondence between elements of multiple TCAR associations stored in the TCAR repository in order to discover relationships that are applied in development of the specified TCAR ontology.

9. The apparatus of claim 1 wherein the integrated development environment is configured to utilize metagenomics analysis in developing the specified TCAR ontology, the action repertoire and the policy base.

10. The apparatus of claim 1 wherein performing the one or more reasoning operations comprises building a predictive model for best next actions within customer dialogs based on triggers, context and results.

11. The apparatus of claim 1 wherein performing the one or more reasoning operations comprises analyzing the selected TCAR associations to identify successful and unsuccessful campaign approaches for the ongoing customer communications.

12. The apparatus of claim 11 wherein identifying the successful and unsuccessful campaign approaches for the ongoing customer communications utilizes one or more of customer recency, frequency and monetary value metrics, customer lifetime value metrics and customer advocacy strength and reach metrics.

13. A method comprising:
configuring a processing platform to implement a unified framework for representation and processing of trigger, context, action and result (TCAR) associations and constituent elements thereof in relation to customer communications in an enterprise;
capturing events by detecting one or more triggers associated with customer-related events, finding context for the one or more triggers by capturing historical and ongoing events for one or more customers associated with the customer-related events, and generating one or more action-response links each comprising at least one action specifying one or more responses to a given trigger based on its associated context and at least one response comprising one or more events that plausibly occurred responsive to the given action based on the given trigger and its associated context;
transmogrifying corresponding TCAR associations for storage in a TCAR repository by transforming the triggers, context and action-response links for the captured events into a unified representation governed by a specified TCAR ontology;
performing one or more reasoning operations over selected ones of the TCAR associations stored in the TCAR repository utilizing one or more policies stored in the TCAR repository to identify one or more actions to orchestrate based on analysis of the selected TCAR associations and the policies stored in the TCAR repository;
orchestrating one or more actions determined at least in part by the one or more reasoning operations to control one or more of content, channel, and timing of ongoing customer communications, the one or more actions being selected from an action repertoire stored in the TCAR repository;
wherein the capturing, transmogrifying, performing and orchestrating are performed by the processing platform utilizing the unified framework;
configuring the processing platform to implement an integrated development environment configured for performing an operations configuration loop and an optimization configuration loop;
wherein the operations configuration loop comprises capturing the events, developing the specified TCAR ontology, and orchestrating the actions based on reasoning over the TCAR repository;
wherein the optimization configuration loop comprises monitoring impacts of the orchestrated actions using one or more analytic tools and developing the action repertoire and the policy base by analyzing: (i) alignment or other correspondence between elements of multiple TCAR associations stored in the TCAR repository; and (ii) the monitored impacts of the orchestration actions; and
wherein the processing platform comprises one or more processing devices each comprising a processor coupled to a memory.

14. The method of claim 13 wherein orchestrating one or more actions determined at least in part by the one or more reasoning operations comprises controlling at least one of a reactive action and a proactive action utilizing one or more channels configured for communication with customers.

15. The method of claim 13 further comprising the integrated development environment analyzing alignment or other correspondence between elements of multiple TCAR associations stored in the TCAR repository in order to discover relationships that are applied in development of the specified TCAR ontology.

16. The method of claim 13 wherein the integrated development environment is configured to utilize metagenomics analysis in developing the specified TCAR ontology, the action repertoire and the policy base.

17. The method of claim 13 wherein performing the one or more reasoning operations comprises building a predictive model for best next actions within customer dialogs based on triggers, context and results.

18. An article of manufacture comprising a non-transitory processor-readable storage medium having encoded therein executable code of one or more software programs, wherein the one or more software programs when executed by a processing platform comprising one or more processing devices each comprising a processor coupled to a memory cause the processing platform:
to configure a processing platform to implement a unified framework for representation and processing of trigger, context, action and result (TCAR) associations and constituent elements thereof in relation to customer communications in an enterprise;
to capture events by detecting one or more triggers associated with customer-related events, finding context for the one or more triggers by capturing historical and ongoing events for one or more customers associated with the customer-related events, and generating one or more action-response links each comprising at least one action specifying one or more responses to a given trigger based on its associated context and at least one response comprising one or more events that plausibly occurred responsive to the given action based on the given trigger and its associated context;
to transmogrify corresponding TCAR associations for storage in a TCAR repository by transforming the triggers, context and action-response links for the captured events into a unified representation governed by a specified TCAR ontology;
to perform one or more reasoning operations over selected ones of the TCAR associations stored in the TCAR repository utilizing one or more policies stored in the TCAR repository to identify one or more actions to orchestrate based on analysis of the selected TCAR associations and the policies stored in the TCAR repository; and
to orchestrate one or more actions determined at least in part by the one or more reasoning operations to control one or more of content, channel, and timing of ongoing customer communications, the one or more actions being selected from an action repertoire stored in the TCAR repository;

wherein the capturing and transmogrifying, performing and orchestrating are performed by the processing platform utilizing the unified framework;

to configure the processing platform to implement an integrated development environment configured for performing an operations configuration loop and an optimization configuration loop;

wherein the operations configuration loop comprises capturing the events, developing the specified TCAR ontology, and orchestrating the actions based on reasoning over the TCAR repository; and wherein the optimization configuration loop comprises monitoring impacts of the orchestrated actions using one or more analytic tools and developing the action repertoire and the policy base by analyzing: (i) alignment or other correspondence between elements of multiple TCAR associations stored in the TCAR repository; and (ii) the monitored impacts of the orchestration actions.

19. The article of manufacture of claim 18 wherein the integrated development environment is configured to analyze alignment or other correspondence between elements of multiple TCAR associations stored in the TCAR repository in order to discover relationships that are applied in development of the specified TCAR ontology.

20. The article of manufacture of claim 18 wherein the integrated development environment is configured to utilize metagenomics analysis in developing the specified TCAR ontology, the action repertoire and the policy base.

* * * * *